US006700625B1

(12) United States Patent
Fujii (10) Patent No.: US 6,700,625 B1
(45) Date of Patent: *Mar. 2, 2004

(54) IMAGE PROCESSING APPARATUS AND METHOD FOR ACCEPTING IMAGE SIGNALS FROM A MEDIUM OR SOURCE OF A PLURALITY OF TYPES TO DISPLAY IMAGES OF A PLURALITY OF FRAMES SIMULTANEOUSLY ON A SCREEN (75) Inventor: Tadashi Fujii, Asaka (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/443,307

(22) Filed: May 17, 1995

(30) Foreign Application Priority Data

May 18, 1994 (JP) .............................. 6-127129

(51) Int. Cl.$^7$ ............................................. H04N 5/445
(52) U.S. Cl. ..................................................... 348/588
(58) Field of Search ............................. ; 348/588, 564, 348/584, 565, 566, 567, 568; 345/603, 788, 781, 800; H04N 5/262, 5/265, 5/45, 5/445

(56) References Cited

U.S. PATENT DOCUMENTS

| 4,218,710 A | * | 8/1980 | Kashigi et al. | ............. 348/584 |
| 4,729,028 A | * | 3/1988 | Micic et al. | ................. 348/588 |
| 4,876,600 A | * | 10/1989 | Pietzsch | ..................... 348/588 |
| 4,893,258 A | * | 1/1990 | Sakuragi | |
| 5,327,156 A | | 7/1994 | Masukane et al. | |
| 5,334,994 A | * | 8/1994 | Takagi | |
| 5,426,731 A | | 6/1995 | Masukane et al. | |
| 5,448,307 A | * | 9/1995 | Gelissen et al. | ............. 348/584 |
| 5,561,472 A | * | 10/1996 | Maietta | ...................... 348/588 |
| 5,682,207 A | * | 10/1997 | Takeda et al. | |

FOREIGN PATENT DOCUMENTS

| GB | 2267202 | * | 11/1993 | .......... H04N/5/262 |
| JP | 4-88477 | | 3/1992 | |
| JP | 5-37873 | * | 2/1993 | |
| JP | 0122604 | * | 5/1993 | .......... H04N/5/265 |
| JP | 05-189184 | * | 7/1993 | |
| JP | 5-216463 | | 8/1993 | |
| JP | 5-316447 | * | 11/1993 | |

* cited by examiner

*Primary Examiner*—David E. Harvey
(74) *Attorney, Agent, or Firm*—Birch, Stewart, Kolasch & Birch, LLP (57) ABSTRACT An image processing apparatus and method in which image data stored in storage media of a plurality of different types or output by image signal generating sources of a plurality of different types can be reproduced simultaneously on the same monitor screen. Original image data provided by storage media or image signal generating sources of a plurality of types is converted to reduced image data representing pictures of reduced size. The original image data or the reduced image data is stored in a display memory in an arrangement capable of constructing a split-screen display. A plurality of frames of (reduced) image data read out of different storage media, etc. are stored in the display memory. These items of image data from the display memory are converted to image signals suitable for being displayed, and the image signals are applied to a monitor display unit. As a result, images of a plurality of frames represented by image data provided by storage media or image signal generating sources of a plurality of different types are displayed on one screen simultaneously.

29 Claims, 5 Drawing Sheets

IMAGE PROCESSING APPARATUS AND METHOD FOR ACCEPTING IMAGE SIGNALS FROM A MEDIUM OR SOURCE OF A PLURALITY OF TYPES TO DISPLAY IMAGES OF A PLURALITY OF FRAMES SIMULTANEOUSLY ON A SCREEN

BACKGROUND OF THE INVENTION

1. Field of the Invention

This invention relates to an image processing apparatus and method.

2. Description of the Related Art

In an image processing apparatus having a function for recording/reproducing image data representing the image of a subject photographed using a solid-state image sensing device such as a CCD, the image data representing the image of the photographed subject can be recorded on storage media of a plurality of types (e.g., a memory card, the memory of a personal computer, etc.). However, a plurality of frames of image data that have been read out of storage media of a plurality of different types cannot be reproduced simultaneously on the same monitor screen. Consequently, a plurality of frames of images represented by image data stored in storage media of a plurality of types cannot be compared directly on a monitor screen. In order to compare these images, it is required that they be printed out.

SUMMARY OF THE INVENTION

An object of the present invention is to provide an image processing apparatus and method in which image data stored in storage media of or outputted by image signal generating sources of a plurality of different types can be reproduced simultaneously on the same monitor screen.

According to the present invention, the foregoing object is achieved by providing an image processing apparatus comprising an image signal processor for converting image signals, provided by storage media or image signal generating sources of a plurality of types, to respective items of image data in a prescribed format, and an image reducer converting image data, which is output by the image signal processor, to reduced image data, which represents a reduced image, in accordance with a given reduction ratio. An image memory capable of storing at least one screen of image data, multiple-screen construction for storing image data, which has been provided by a designated storage medium or image signal generating source and converted by the image signal processor, or reduced image data reduced by the image reduction means, in the image memory in an arrangement capable of constructing multiple screens. An image signal output converting the image data, which has been stored in the image memory, to an image signal suitable for being displayed, and outputting this image signal. The image signal referred to here covers the concept of a video signal and image data.

According to the present invention, the foregoing object is achieved by providing an image processing method comprising the steps of converting image signals, provided by storage media or image signal generating sources of a plurality of types, to respective items of image data in a prescribed format, converting the converted image data to reduced image data, which represents a reduced image, in accordance with a given reduction ratio if the given reduction ratio represents image reduction, storing the image data provided by a designated storage medium or image signal generating source and converted to the prescribed format, or the reduced image data obtained by image reduction, in an image memory in an arrangement capable of constructing multiple screens, converting the image data, which has been stored in the image memory, to an image signal suitable for being displayed, and outputting this image signal.

In accordance with the present invention, original image data provided by a plurality of storage media or image signal generating sources is converted to reduced image data representing a reduced image, and the original image data or the reduced image data is stored in an image memory that is capable of storing one screen of image data in an arrangement in which multiple split screens can be constructed. A plurality of frames of the (reduced) image data read out of different storage media or the like are stored in the image memory. These items of image data in the image memory are converted to image signals, which are suitable for being displayed, and the image signals are output. Accordingly, if the output image signals are applied to a monitor display unit, a plurality of frames of image data represented by the image data read out of storage media or image signal generating sources of a plurality of different types are displayed simultaneously on a single monitor screen. Thus, images of a plurality of frames represented by image data provided by storage media or image signal generating sources of a plurality of types can be compared directly on a monitor screen without being printed out. If a high-definition display unit is used as the monitor display unit, even reduced images can be displayed clearly. Alternatively, images can be displayed without always being reduced in size. As a result, a comparison can be made in appropriate fashion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2a and 2b are diagrams illustrating processing through which image data read out of different media are reproduced in a multiple split-screen arrangement, in which FIG. 2a shows a monitor display screen split into a plurality of zones in accordance with a set screen arrangement, and FIG. 2b shows the images, which have been read out of the different media, displayed on the same display screen;

DESCRIPTION OF THE PREFERRED EMBODIMENT

An embodiment of the present invention will now be described in detail with reference to the accompanying drawings.

Figure 1:
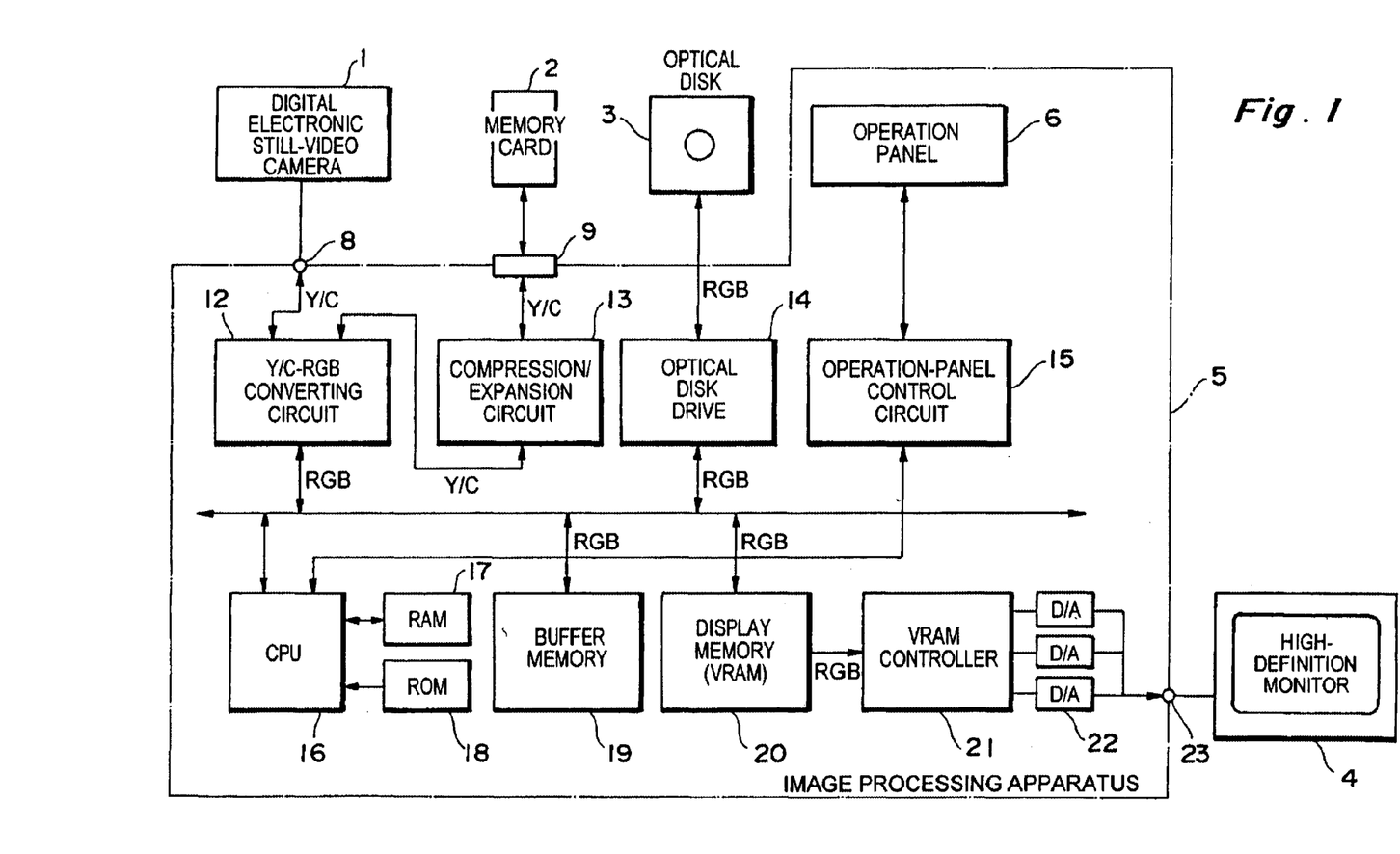
FIG. 1 is a block diagram illustrating the electrical configuration of a digital image processing apparatus.

FIG. 1 is a block diagram showing the electrical configuration of a digital image processing system which includes an image processing apparatus 5 according to the present invention.

A digital electronic still-video camera 1 is exemplified as an image signal generating source, and a memory card 2 and an optical disk 3 are exemplified as storage media. These are capable of being connected to the image processing apparatus 5. A magnetic disk and an internal or external memory of a personal computer can also be mentioned as storage media.

The image processing apparatus 5 is provided with a connector 8 for connecting the digital electronic still-video camera 1, a connector 9 for loading and connecting the memory card 2, and an optical disk drive 14 for reading data recorded on the optical disk 3.

The image processing apparatus 5 is further provided with a Y/C-RGB converting circuit 12 for converting Y/C data (luminance data Y and color data C representing an image, wherein the color data C generally is dot-sequential data of color-difference data R-Y and B-Y), which is provided by the digital electronic still-video camera 1, to data R, G, B representing the three primary colors, and a compression/expansion circuit 13 for decompressing (expanding) compressed image data read out of the memory card 2 and compressing image data to be written to the memory card 2. The Y/C-RGB converting circuit 12, compression/expansion circuit 13 and optical disk drive 14 are connected to an internal common bus.

The image processing apparatus 5 further includes a CPU 16, a buffer memory 19 and a display memory (VRAM) 20, which are connected to the internal common bus. The CPU 16 is equipped with a RAM 17 for storing data and the like and a ROM 18 for storing programs. The buffer memory 19 has a capacity capable of storing one frame of the image data R, G, B. In this embodiment, the buffer memory 19 is capable of storing 640×512 pixels of R, G, B data.

A high-definition monitor display unit 4 is used to display images and therefore the display memory 20 has a capacity capable of storing 1280×1024 pixels of R, G, B data (which is one screen of image data as presented on the monitor display unit 4). The image data R, G, B (image data which constructs a multiple split-screen display, as will be described later) stored in the display memory 20 is read out by a VRAM controller 21, converted to analog signals for each of the colors by a D/A converting circuit 22 and applied to the display unit 4 via an output terminal 23.

An operation (control) panel 6 includes keys for selecting the digital electronic still-video camera 1, the memory card 2 or the optical disk 3, a key for designating a desired frame of a plurality of frames of image data stored in these storage media, a key for selecting the multiple split-screen arrangement, and a command key for causing the image processing apparatus 5 to perform other desired operations. The operation panel 6 is connected to the CPU 16 via an operation-panel control circuit 15. The CPU 16 responds to commands from the operation panel 6 by communicating with the camera 1, accessing the memory card 2, controlling the optical disk drive 4, etc. As will be described later, the CPU 16 further forms multiple screens, controls the display, etc.

The digital electronic still-video camera 1 is capable of photographing a subject, executing recording processing by recording the image data, which represents the image of the subject obtained by photography, on the memory card 2 upon compressing (or not compressing) the image data, and communication processing for transmitting the image data obtained by photography to the image processing apparatus 5 via a cable. In a case where "camera (on-line)" has been set in the operation panel 16 as the input medium, the image data (Y/C data) obtained by photography is output by the digital electronic still-video camera 1 and applied to the image processing apparatus 5 via the connector 8. The image data is converted to R, G, B data by the Y/C-RGB converting circuit 12, and the R, G, B data is stored in the buffer memory 19.

The memory card 2 can be freely loaded into and unloaded from the digital electronic still-video camera 1 and image processing apparatus 5. The memory card 2 has an internal semiconductor memory that is capable of storing a plurality of frames of compressed image data or uncompressed image data. If "memory card" is set in the operation panel 6 as the input medium, compressed Y/C data representing a designated frame is read out of the memory card 2 under the control of the CPU 16. The expanded Y/C image data read out is compressed by the compression/expansion circuit 13. The expanded Y/C image data is converted to R, G, B image data by the Y/C-RGB converting circuit 12, and the R, G, B image data is stored in the buffer memory 19. It goes without saying that when uncompressed image data has been read out of the memory card 2, decompression processing is not executed.

R, G, B image data that has not been compressed is stored on the optical disk 3. The latter is located in the optical disk drive 14 of the image processing apparatus 5. If "optical disk" is set as the input medium, the drive 14 is started up by the CPU 16 and R, G, B image data representing a designated frame is read out of the optical disk 3. The read R, G, B image data is stored in the buffer memory 19.

Figure 2A:
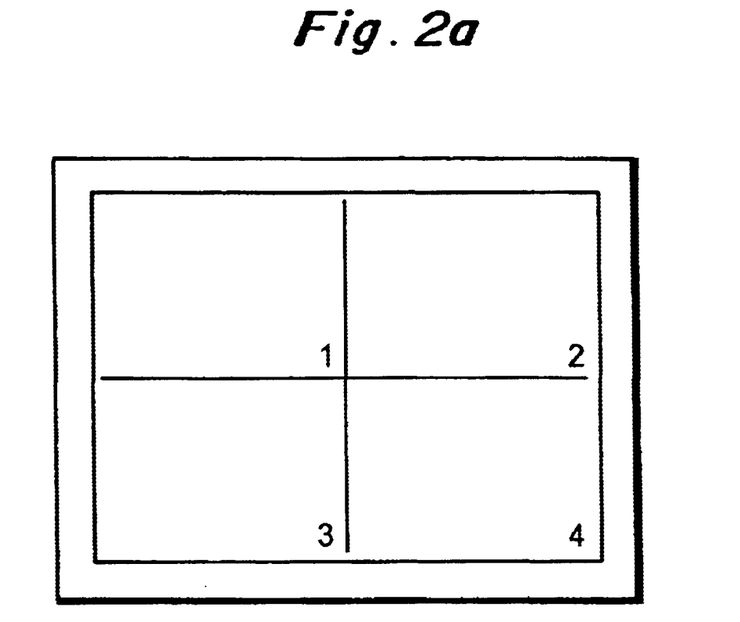

Multiple screens are constructed in order that a plurality of frames of image data thus read out of image data generating sources or storage media of a plurality of types may be displayed simultaneously on the display screen of the display unit 4. An example of the multiple-screen arrangement is illustrated in FIG. 2a. The screen is split into a 2×2, 3×3, 4×4 arrangement or the like. The numbers 1~4 illustrated are numbers representing the zones in which the screen has been split. The reduction ratio qf the image data is decided in conformity with the screen arrangement. The image data for constructing the multiple screens is created in the display memory 20.

In case of the 2×2 split-screen arrangement, for example, processing for reducing the image data is not necessary. The reason for this is that the image data of one from that has been stored in the buffer memory 19 is composed of 640×512 pixels and the display memory 20 is capable of storing 1280×1024 pixels of image data. The image data is read out of the buffer memory 19 and stored in the display memory 20 in dependence upon the positions of zones constituting the multiple split-screen display. For example, when an image of one frame is displayed in zone 2 shown in FIG. 2a, the image data representing this image is stored in the display memory 20 at an address corresponding to the display on the zone 2 when this data is read out of the memory 19.

Figure 3:
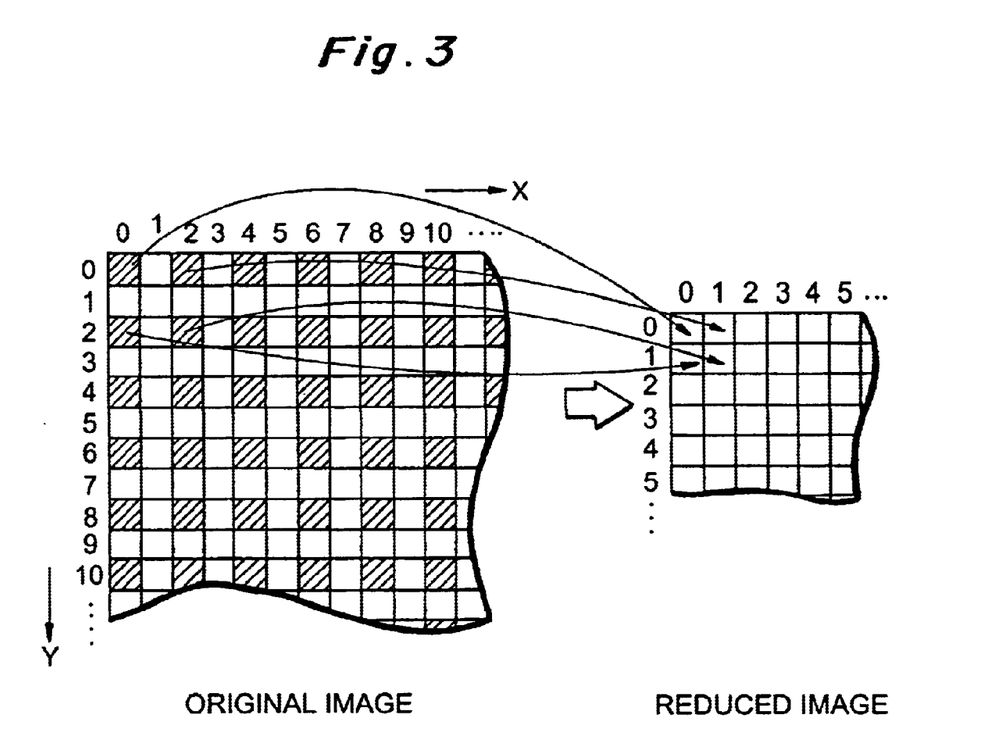
FIG. 3 is a diagram showing processing for reducing (thinning out) image data.

In case of the 4×4 split-screen arrangement, an image represented by data stored in the buffer memory 19 requires reduction. In this case, the image data is reduced by one-half in the both the horizontal and vertical directions. Image reduction processing is performed by thinning-out processing. As shown in FIG. 3, reduced image data, the reduction ratio of which is 1/2, is obtained by thinning out image data one item at a time in the horizontal and vertical directions. Averaging processing is another example of reduction processing. This method involves calculating the average value of four mutually adjacent pixels of image data in the original image and adopting this average value as one pixel of image data in the reduced image (in a case where the reduction ratio is 1/2).

In either case, transfer of image data from the buffer memory 19 to the display memory 20 (which includes determining addresses so as to construct multiple screens) and image reduction processing are executed by the CPU 16.

Figure 4A:
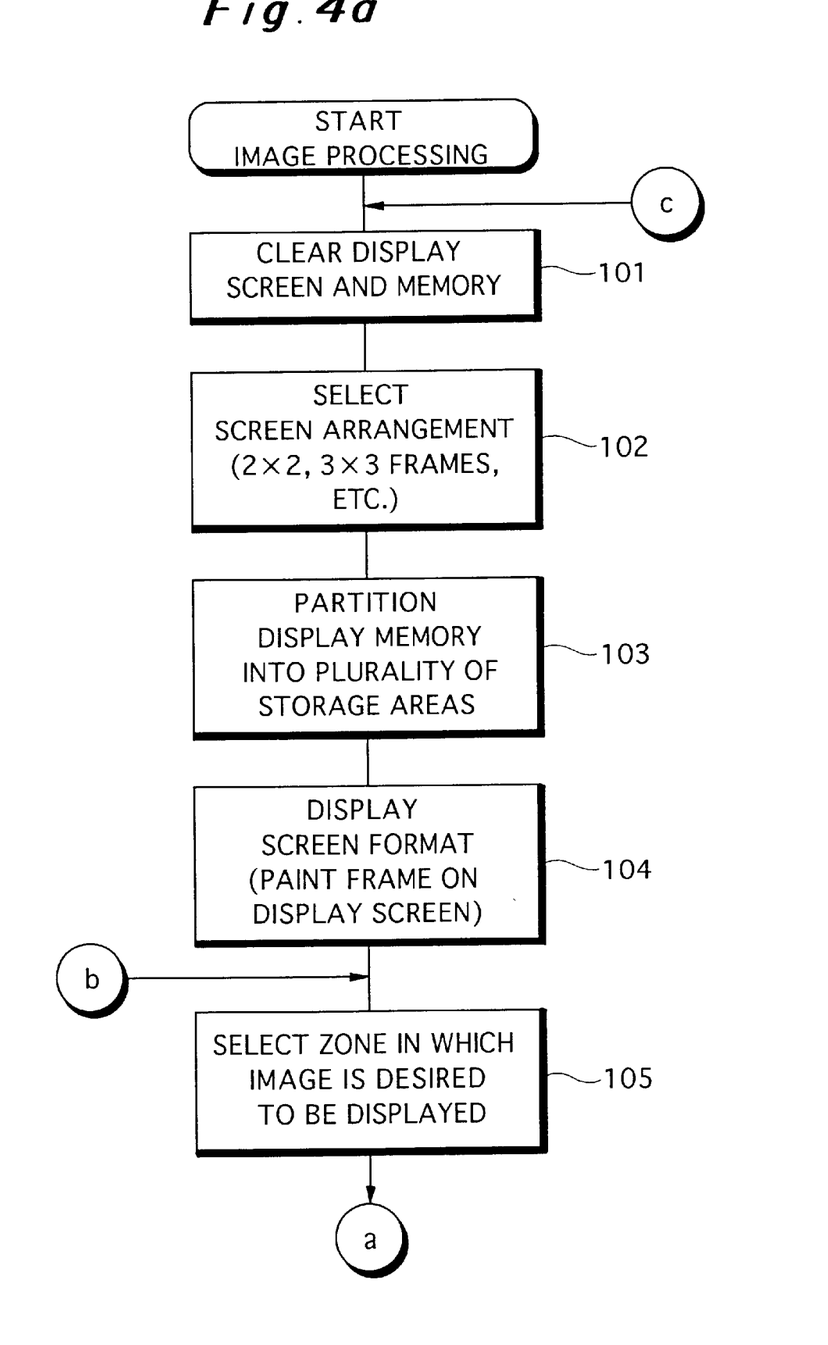
FIGS. 4a and 4b are flowcharts showing the flow of one cycle of image processing.
Figure 4B:
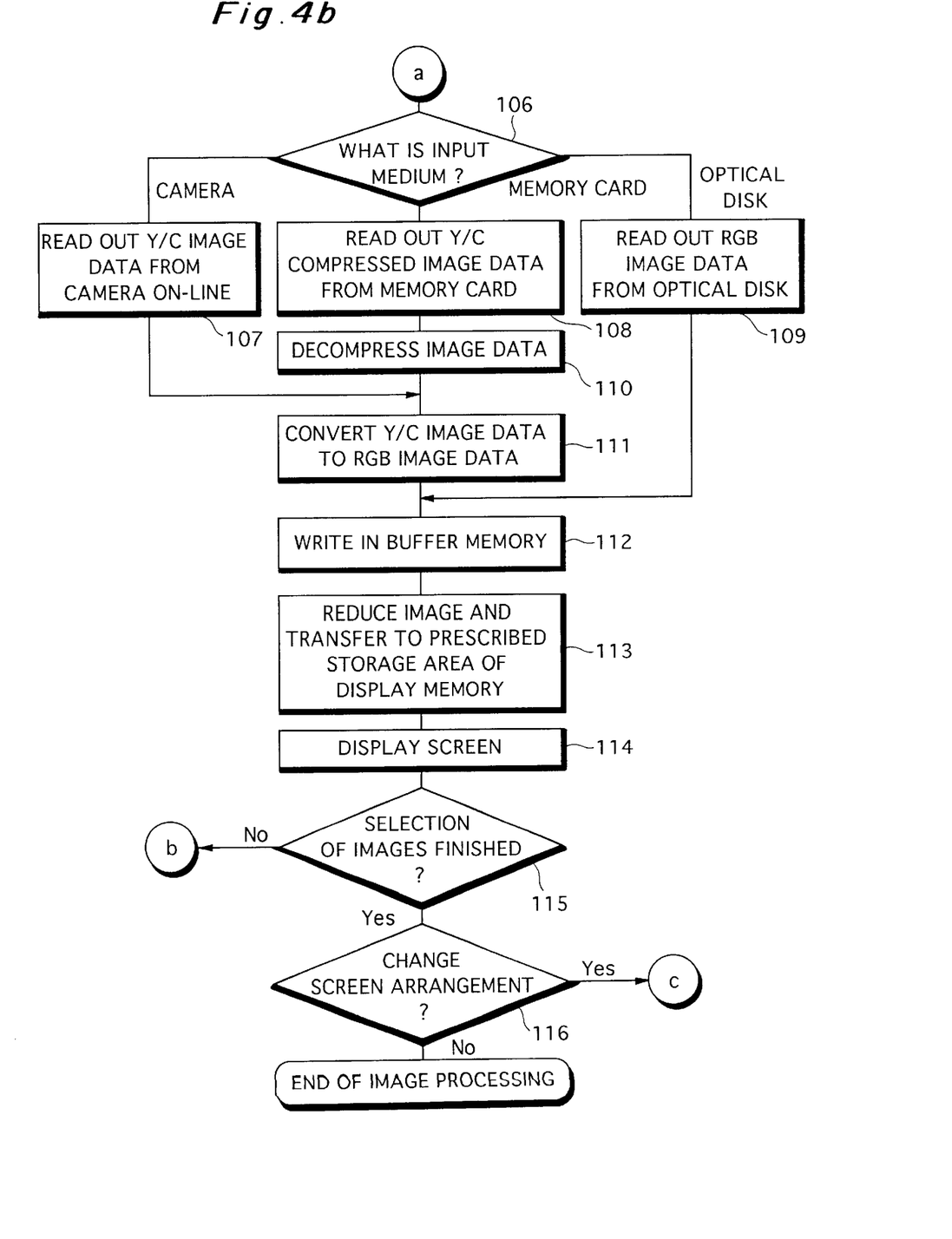

FIGS. 4a and 4b are flowcharts illustrating the flow of one cycle of image processing.

The contents of the memories 19, 20 in the image processing apparatus 5 are cleared (step 101). As a result, the screen on the monitor display unit 4 is cleared. Using the operation panel 6, the operator selects a screen arrangement (step 102). The screen arrangement is selected from among a plurality of types, prepared in advance. Examples of the split-screen arrangements are the aforementioned 2×2, 3×3, 4×4 split-screen arrangements, etc.

The CPU 16 partitions the display memory (VRAM) 20 into a plurality of storage areas in conformity with the screen arrangement designated by the operator (step 103). A frame representing the split zones appears on the screen of the monitor display unit 4 (see FIG. 2a) (step 104). At this time the numbers representing the respective zones also are displayed on the screen.

Using the operation panel 6, the operator enters a number to select the zone in which an image is desired to be displayed (step 105). Next, the operator enters the input medium from which is to be read the image data representing the image whose screen is desired to be displayed, as well as a frame number (ID number) (step 106). The image data having the designated frame number is read out of the designated input medium (the camera 1, memory card 2 or optical disk 3) under the control of the CPU 16.

If the designated input medium is "camera (on-line)", the Y/C image data is read out of the digital electronic still-video camera 1 (step 107), this image data is converted to R, G, B image data by the Y/C-RGB converting circuit 12 (step 111) and the R, G, B image data is stored in the buffer memory 19 (step 112).

If the designated input medium is "memory card", the compressed Y/C image data representing the image of the designated frame is read out of the memory card 2 (step 108), decompressed by the compression/expansion circuit 13 (step 110) and converted to R, G, B image data by the Y/C-RGB converting circuit 12 (step 111), with the R, G, B image data being stored in the buffer memory 19 (step 112).

If the designated input medium is "optical disk", then the R, G, B data representing the image of the designated frame is read out of the optical disk 3 by the optical disk drive 14 (step 109) and stored in the buffer memory 19 (step 112).

In accordance with the designated split-screen arrangement, the CPU 16 calculates a reduction ratio (inclusive of a reduction ratio=1, namely no reduction) for when image data is written in the display memory (VRAM) 20. The CPU 16 reduces (as by thinning-out processing), at the calculated reduction ratio, the R, G, B digital image data stored in the buffer memory 19, and writes the reduced image data in the storage area of the display memory (VRAM) 20 corresponding to the designated zone (step 113).

The R, G, B image data stored in the display memory (VRAM) 20 is converted to analog signals, which are then applied to the monitor display unit 4. As a result, the reduced image is displayed on the screen in the zone designated (step 114).

Figure 2B:
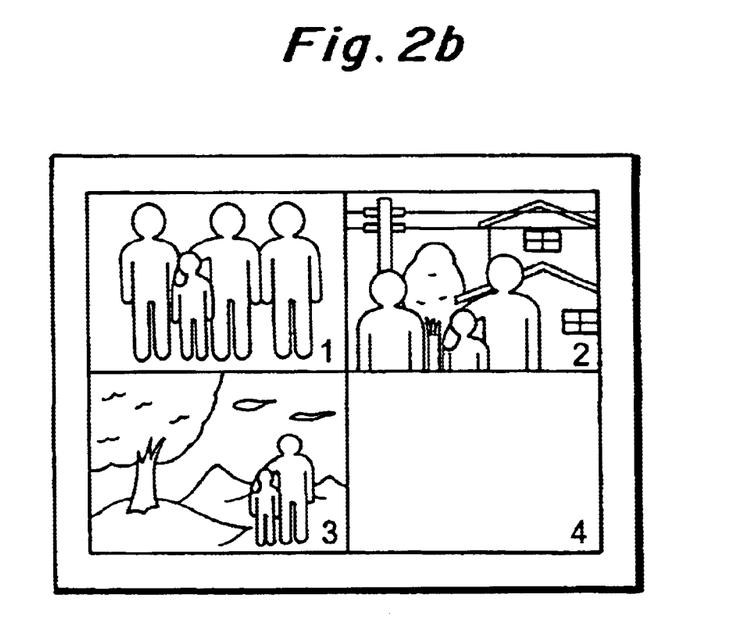

In a case where there is another image desired to be displayed (YES at step 115), the processing from step 105 to step 115 is repeated. In this way images read out of each input medium and reduced may be displayed in each of the zones on the display screen, as depicted in FIG. 2b.

In a case where it is desired to change the screen arrangement (YES at step 116), the processing from step 101 to step 116 is repeated.

The embodiment described above is premised on the fact that one frame of image data read out of the digital electronic still-video camera 1, memory card 2 and optical disk 3 is composed of 640×512 pixels. In a case where the image data provided by these input media has a higher definition (1280×1024 pixels, for example), the buffer memory 19 would have a capacity capable of storing this high-definition image data. Further, reduction processing would be absolutely necessary in this case in order to construct the multiple screen.

As many apparently widely different embodiments of the present invention can be made without departing from the spirit and scope thereof, it is to be understood that the invention is not limited to the specific embodiments thereof except as defined in the appended

What is claimed is:

1. An image processing apparatus comprising:

a plurality of types of image data processing means for converting a plurality of digital image data, provided by at least two of a first digital data storage medium, a second digital data storage medium of a different type than said first digital data storage medium, and a first digital image data generating source, said plurality of digital image data having different formats depending on said digital data storage media or digital image data generating source, to respective items of image data in a prescribed format, at least one of said image data processing means having image data expansion means for expanding digital image data when compressed digital image data is provided;

image reduction means for converting digital image data, which is output by one of said plurality of said image data processing means, to reduced digital image data, which represents a reduced image, in accordance with a given reduction ratio;

an image memory capable of storing at least one screen of digital image data;

multiple-screen construction means for storing digital image data, which has been provided by a designated digital data storage medium or digital image data generating source and converted by one of said plurality of said image data processing means, or reduced digital image data reduced by said image reduction means, in said image memory in an arrangement capable of constructing multiple screens;

means for selecting a desired screen arrangement from a plurality of screen arrangements; and image signal output means for converting, regardless of prescribed format, the digital image data, which has been stored in said image memory, to an image signal of a predetermined format suitable for being displayed, and outputting this image signal in the arrangement selected by said means for selecting the desired screen arrangement.

2. An image processing method comprising the steps of:

converting a plurality of image data, which are provided by at least two of a first digital data storage medium, a second digital data storage medium of a different type than said first digital data storage medium, and a first digital image data generating source, and having different formats depending on said digital data storage media or digital image data generating source, to respective items of image data in a prescribed format, and expanding digital image data when compressed digital image data is provided;

storing image data provided by a designated storage medium or image data generating source and converted to a prescribed format, or reduced digital image data obtained by converting this digital image data to reduced digital image data representing a reduced digital image, in an image memory in an arrangement capable of constructing multiple screens;

selecting a desired screen arrangement from a plurality of screen arrangements; and converting, regardless of prescribed format, the plurality of digital image data, which has been stored in said image memory, to an image signal of a predetermined format suitable for being displayed, and outputting this image signal in the arrangement selected by said means for selecting the desired screen arrangement.

3. An image processing apparatus comprising:

a plurality of types of image data processing circuits for converting a plurality of digital image data, provided by at least two of a first digital data storage medium, a second digital data storage medium of a different type than said first digital data storage medium, and a first digital image data generating source, and having different formats depending on said digital data storage media or digital image data generating source, to respective items of digital image data in a prescribed format, at least one of said image processing circuits having an image data expansion circuit for expanding digital image data when compressed digital image data is provided;

an image reduction circuit for converting digital image data, which is output by one of said plurality of said digital image data processing circuits, to reduced digital image data, which represents a reduced image, in accordance with a given reduction ratio;

an image memory capable of storing at least one screen of digital image data;

a multiple-screen construction circuit for storing digital image data, which has been provided by a designated digital data storage medium or digital image data generating source and converted by one of said plurality of said digital image data processing circuits, or reduced digital image data reduced by said image reduction circuit, in said image memory in an arrangement capable of constructing multiple screens;

a selecting circuit for selecting a desired screen arrangement from a plurality of screen arrangements; and an image signal output circuit for converting, regardless of prescribed format, the digital image data, which has been stored in said image memory, to an image signal of a predetermined format suitable for being displayed, and outputting this image signal in the arrangement selected by the circuit for selecting the desired screen arrangement.

4. The method as recited in claim 2, further comprising selecting a desired screen arrangement having a plurality of frames to be simultaneously displayed.

5. The method as recited in claim 4, further comprising partitioning storage areas in said image memory into said plurality of frames.

6. The method as recited in claim 4, further comprising outputting said plurality of frames to a display to thereby display said desired screen arrangement.

7. The method as recited in claim 2, further comprising selecting a zone in which a frame is to be displayed.

8. The method as recited in claim 7, wherein said selecting step includes selecting an input medium from which the data for the frame in the zone is to be read.

9. The apparatus as recited in claim 1, further comprising means for selecting a desired screen arrangement having a plurality of frames to be simultaneously displayed.

10. The apparatus as recited in claim 9, further comprising means for partitioning storage areas in said image memory into said plurality of frames.

11. The apparatus as recited in claim 9, further comprising means for outputting said plurality of frames to a display to thereby display said desired screen arrangement.

12. The apparatus as recited in claim 1, further comprising means for selecting a zone in which a frame is to be displayed.

13. The apparatus as recited in claim 12, wherein said means for determining media includes means for selecting an input medium from which the data for the frame in the zone is to be read.

14. The apparatus as recited in claim 3, further comprising an arrangement input receiving a desired screen arrangement having a plurality of frames to be simultaneously displayed and supplying said desired screen arrangement to said multiple-screen construction circuit.

15. The apparatus as recited in claim 14, wherein said multiple screen construction circuit partitions said image memory into said plurality of frames.

16. The apparatus as recited in claim 14, wherein said multiple-screen construction circuit outputs said desired screen arrangement, without any frame content information, to a display to thereby display said desired screen arrangement.

17. The apparatus as recited in claim 3, further comprising a zone input receiving a zone of a display in which a frame is to be displayed.

18. The apparatus as recited in claim 17, wherein said a media input receives an input medium from which the data for the frame in the zone is to be read.

19. The apparatus as recited in claim 1, further comprising a plurality of connectors for connecting said plurality of image processing means and said image signal generating source.

20. The apparatus as recited in claim 1, further comprising means for individually determining medium or source from which image data is to be provided for each of said multiple screens.

21. The method as recited in claim 2, further comprising individually determining media or sources from which image data is to be provided for each of said multiple screens.

22. The apparatus as recited in claim 3, further comprising a plurality of connectors for connecting said plurality of image processing circuits and said image signal generating source.

23. The apparatus as recited in claim 3, further comprising a media input which individually determines media or sources from which image data is to be provided for each of said multiple screens.

24. The image processing apparatus of claim 1, wherein the plurality of screen arrangements include at least one of a two frame by two frame arrangement, a three frame by three frame arrangement, and a four frame by four frame arrangement.

25. The image processing apparatus of claim 2, wherein the plurality of screen arrangements include at least one of a two frame by two frame arrangement, a three frame by three frame arrangement, and a four frame by four frame arrangement.

26. The image processing apparatus of claim 3, wherein the plurality of screen arrangements include at least one of a two frame by two frame arrangement, a three frame by three frame arrangement, and a four frame by four frame arrangement.

27. The image processing apparatus of claim 1, wherein the plurality of screen arrangements have different numbers of images simultaneously displayed.

28. The image processing apparatus of claim 2, wherein the plurality of screen arrangements have different numbers of images simultaneously displayed.

29. The image processing apparatus of claim 3, wherein the plurality of screen arrangements have different numbers of images simultaneously displayed.

* * * * *